US012687271B2

(12) United States Patent
Nykerk

(10) Patent No.: US 12,687,271 B2
(45) Date of Patent: Jul. 21, 2026

(54) MASKED DOUBLE-SIDED OPTICAL SHEET LIGHTING ASSEMBLY

(71) Applicant: Flex-N-Gate Advanced Product Development, LLC, Windsor (CA)

(72) Inventor: Todd Nykerk, Holland, MI (US)

(73) Assignee: Flex-N-Gate Advanced Product Development, LLC, Windsor (CA)

( * ) Notice: Subject to any disclaimer, the term of this patent is extended or adjusted under 35 U.S.C. 154(b) by 0 days.

(21) Appl. No.: 18/782,328

(22) Filed: Jul. 24, 2024

(65) Prior Publication Data

US 2025/0035283 A1 Jan. 30, 2025

Related U.S. Application Data

(60) Provisional application No. 63/515,476, filed on Jul. 25, 2023.

(51) Int. Cl.

| | |
|---|---|
| ***F21S 41/50*** | (2018.01) |
| ***F21S 41/153*** | (2018.01) |
| ***F21S 41/20*** | (2018.01) |
| ***F21S 41/43*** | (2018.01) |
| ***F21S 43/14*** | (2018.01) |
| ***F21S 43/20*** | (2018.01) |
| ***F21S 43/50*** | (2018.01) |

(52) U.S. Cl.

CPC ............. *F21S 41/50* (2018.01); *F21S 41/153* (2018.01); *F21S 41/285* (2018.01); *F21S 41/43* (2018.01); *F21S 43/14* (2018.01); *F21S 43/265* (2024.05); *F21S 43/50* (2018.01)

(58) Field of Classification Search

CPC .......... F21S 41/50; F21S 41/153; F21S 41/43; F21S 41/285; F21S 43/50; F21S 43/14; F21S 43/265

See application file for complete search history.

(56) References Cited

U.S. PATENT DOCUMENTS

| | | | | |
|---|---|---|---|---|
| 3,592,529 | A * | 7/1971 | Juhlin, Jr. ............. | G03B 21/20 359/566 |
| 8,034,540 | B2 | 10/2011 | Zwadlo | |
| 8,056,929 | B2 | 11/2011 | Hoffman et al. | |
| 8,129,091 | B2 | 3/2012 | Hannum et al. | |
| 8,409,790 | B2 | 4/2013 | Ali et al. | |
| 9,477,152 | B2 | 10/2016 | Blomquist et al. | |
| 9,483,965 | B2 | 11/2016 | Zhou et al. | |

(Continued)

*Primary Examiner* — Matthew J. Peerce

(74) *Attorney, Agent, or Firm* — Avek IP, LLC

(57) ABSTRACT

Disclosed herein are vehicle lamp assemblies comprising a double-sided optical sheet with a mask printed directly onto the optical sheet. The optical sheet comprises a light-homogenizing sheet disposed over a plurality of light-emitting diodes. Instead of placing the mask over the optical sheet on a structure, the light-homogenizing sheet itself serves as a substrate during a printing process such that the mask is printed directly onto the optical sheet. The optical sheet supports the weight of the mask. The mask itself may be opaque with cutouts such that light escapes through the cutouts; the cutouts may be designed to create any number of custom patterns as desired. Other types of masks, such as translucent masks, may also be printed on the other side of the optical sheet to protect portions of the lighting assembly or to otherwise further adjust the lighting character of the vehicle lamp.

20 Claims, 5 Drawing Sheets

(56) References Cited

U.S. PATENT DOCUMENTS

| | | | | |
|---|---|---|---|---|
| 9,684,120 | B2 | 6/2017 | Wolk et al. | |
| 10,753,579 | B2 * | 8/2020 | Nykerk | B44F 1/06 |
| 11,415,294 | B2 | 8/2022 | Hansen | |
| 11,421,848 | B2 | 8/2022 | Simchak | |
| 11,499,683 | B2 | 11/2022 | Teather et al. | |
| 11,624,492 | B2 | 4/2023 | Nykerk | |
| 11,698,180 | B2 * | 7/2023 | Ford | B60Q 1/28 362/459 |
| 2010/0220391 | A1 * | 9/2010 | Abe | G02B 3/005 359/619 |
| 2020/0282925 | A1 * | 9/2020 | Nykerk | B25J 11/00 |
| 2021/0095830 | A1 * | 4/2021 | Hansen | B60R 13/005 |
| 2021/0095831 | A1 * | 4/2021 | Nykerk | B29C 43/36 |

* cited by examiner

MASKED DOUBLE-SIDED OPTICAL SHEET LIGHTING ASSEMBLY

CROSS-REFERENCE TO RELATED APPLICATIONS

This application claims the benefit of priority of U.S. Provisional Patent Application No. 63/515,476, entitled Masked Double-Sided Optical Sheet Lighting Assembly, and filed on Jul. 25, 2023, the disclosure of which is hereby incorporated by reference in its entirety.

BACKGROUND

1. Field

Embodiments of this disclosure relate generally to lighting assemblies and more specifically to automotive vehicle lighting assemblies.

2. Description of the Related Art

The use of optical films/sheets in vehicle lamp assemblies is known. For example, U.S. Pat. No. 11,624,492 to Nykerk discloses a double-sided optical sheet technology, methods for forming double-sided optical sheets, and vehicle lamp assemblies that incorporate double-sided optical sheets. U.S. Pat. No. 11,421,848 to Simchak discloses a light modifier that has optical elements on an inside surface and an opaque covering on the opposite side having apertures aligned with the optical elements. U.S. Pat. No. 11,415,294 to Hansen discloses illuminated fascia panels. U.S. Patent Application Publication No. 2020/0282925 to Nykerk discloses printing onto one side of a clear or translucent article used for an exterior vehicle fascia.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In embodiments of the present disclosure, a lighting assembly for a vehicle includes: an array of light-emitting diodes; an optical sheet oriented to receive light emitted directly from the array of light-emitting diodes; a first pattern of light-modifying elements disposed on a first side of the optical sheet, wherein the first pattern of light-modifying elements includes a first parallel array of convex lenses aligned lengthwise in a first direction 142; a second pattern of light-modifying elements disposed on a second side of the optical sheet opposite the first side, wherein the second pattern of light-modifying elements includes a second parallel array of convex lenses aligned lengthwise in a second direction 144; an offset angle 146 between the first direction 142 and the second direction 144 configured to distribute light emitted from the array of light-emitting diodes such that light emitted from the lighting assembly appears homogeneous; and a mask printed directly on one side of the optical sheet for blocking light through a portion of the optical sheet thereby providing a custom lit appearance of the lighting assembly, wherein the mask is deposited continuously and directly onto at least a portion of each of a plurality of light-modifying elements. The term "continuously," as used herein, means that at least a portion of the mask covers at least part of a plurality of light-modifying elements without gaps or holes. The term "directly," as used herein, means that the mask is deposited onto the light-modifying elements without a gap or intermediate material.

In further embodiments of the present disclosure, a lighting assembly for a vehicle includes: an optical sheet with two sides, wherein a lenticular pattern is formed on each side such that light incident on the optical sheet is homogenized when passing through the sheet, and wherein each lenticular pattern comprises a plurality of lenses; a mask disposed on the sheet that continuously covers at least a portion of each of a plurality of lenses of one of the lenticular patterns, wherein the optical sheet is configured as a substrate such that the mask is printed directly onto the optical sheet with no gap therebetween; and an array of light-emitting diodes configured to backlight the optical sheet and mask.

BRIEF DESCRIPTION OF THE DRAWINGS

Illustrative embodiments of the present disclosure are described in detail below with reference to the attached drawing figures, which are incorporated by reference herein and wherein.

Figure 1:
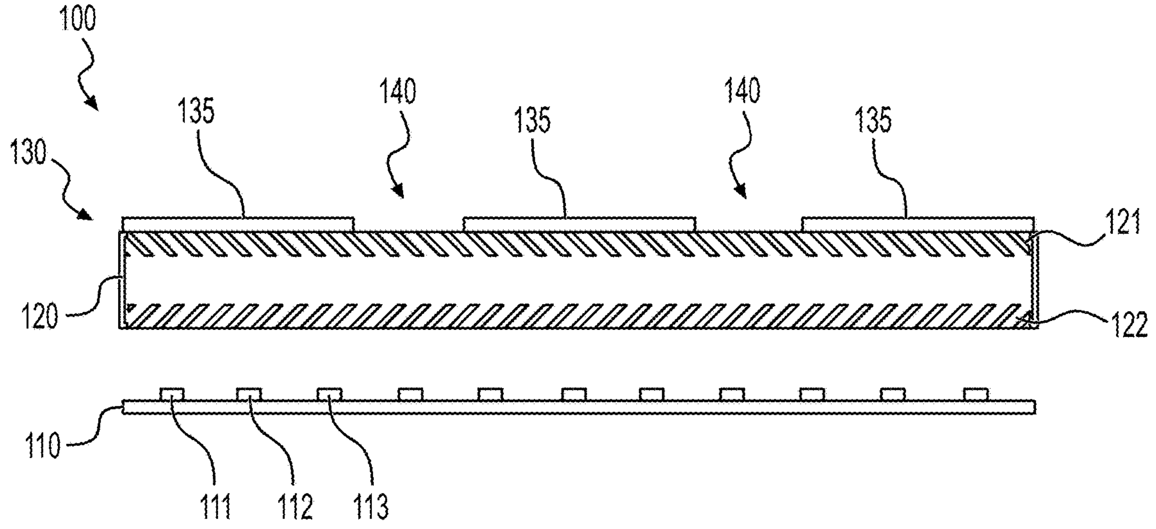
FIG. 1 is a schematic side view showing an embodiment of a vehicle lighting assembly.

The drawing figures do not limit the invention to the specific embodiments disclosed and described herein. The drawings are not necessarily to scale, emphasis instead being placed upon clearly illustrating the principles of the disclosure.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

In various lighting applications, optical sheets may be used to affect light emitted from a light source. The optical sheets are for example optically clear plastic sheets having an array of light modifying elements (e.g., lenticular lenses) on one side, with the opposite side being flat. The array of light modifying elements may be imprinted or molded on the sheet in a pattern. Depending on the size, shape, and focal length of the individual light modifying elements, as well as their collective pattern on the sheet, the optical sheets may be used to shape light from a light source in various ways. For example, light may be shifted, magnified, smoothed, homogenized, etc. To provide different lighting effects, multiple lenticular sheets may be layered on top of one another. The multiple sheets may be layered with varying orientations of lenticular patterns to scatter light in numerous directions. A single optical sheet having lenticular patterns on both sides has been described in U.S. Pat. No. 11,624,492 to Nykerk, which is hereby incorporated by reference in its entirety. The single optical sheet having lenticular patterns imprinted on both sides has a first lenticular pattern on a first side of the sheet that is oriented in a first direction 142, and a second lenticular pattern on a second side of the sheet that is oriented in a second direction 144 which is different than the first direction 142. Such a double-sided optical sheet may be used to effectively homogenize light output using only a single sheet rather than layering multiple one-sided sheets (i.e., optical sheets having a lenticular pattern imprinted on only one side). Homogenizing emitted light is an important function for vehicle lights because non-homogenized light having hot spots can be distracting and even blinding to other drivers. Homogenizing emitted light provides an even illumination that avoids hot spots.

U.S. Pat. No. 11,421,848 to Simchak, which is hereby incorporated by reference in its entirety, discloses a light modifier that has optical elements on an inside surface and an opaque covering on the opposite flat side of the light modifier. The opaque covering includes apertures aligned with the optical elements. The opaque covering may be painted or printed on a clear lens material with the apertures being masked during the painting/printing process or etched away afterwards.

The term fascia is used in the automotive industry in reference to plastic materials used at various locations on a vehicle. Fascia panels may be incorporated into an exterior portion of a vehicle e.g., at the vehicle's headlamp area, grill, bumper, side paneling, into or near a taillight arrangement, as well as other exterior locations unrelated to traditional vehicle lighting. The fascia panels may be decorated ornamentally and in some cases illuminated, such as with U.S. Pat. No. 11,415,294 to Hansen, which is hereby incorporated by reference in its entirety.

Printing onto one side of a clear or translucent article used for an exterior vehicle fascia has been described in U.S. Patent Application Publication No. 2020/0282925 to Nykerk, which is hereby incorporated by reference in its entirety. A flat panel may be cut or otherwise formed into a desired shape, then it is printed with an ink or other coating on one side. Printing on the inside surface avoids exposure to the elements, whereas printing on the outside surface may be used to create a desired look, or to create consonance with a surrounding design scheme. The printing process used could be an inkjet printing process. More specifically, a flatbed or other type of printer could be used. Alternatively, the printing could be done using a multi-axis robotic system (e.g., an inkjet head could be mounted on a robotic arm). This robotic system could be used to print onto non-flat, e.g., three-dimensional surfaces if desired. The printed material may be instantaneously dried using ultraviolet light (UV). Protective coatings may be deposited on top of the ink. Alternatively, a lithographic (litho) press, digital press, or other system enabling printing onto plastic could be used. Additionally, the ink selected for use can be fade resistant if the intended installation on the vehicle involves exposure to direct or indirect sunlight regardless of which side the ink is printed onto.

FIG. 1 shows an exploded view of an exemplary lighting assembly 100 having a double-sided optical sheet 120. A light source 110 is positioned behind optical sheet 120. In some embodiments, light source 110 includes a plurality of light-emitting diodes (LEDs) mounted on a printed-circuit board (PCB). For example, as depicted in FIG. 1, light source includes a first LED 111, a second LED 112, a third LED 113, etc. Not all LEDs are enumerated for clarity of illustration. Each of the individual LEDs may be independently lit and unlit via a controller (not shown) that is electrically and communicatively coupled with the PCB. The LEDs may be all of one type or of a plurality of sizes, colors, and/or intensities. Alternatively, light source 110 may use a halogen bulb or a plurality of halogen bulbs, as well as other types of light sources.

Double-sided optical sheet 120 is an optically clear sheet made of plastic with a lenticular pattern (e.g., a pattern of lenticular lenses) molded into each side of optical sheet 120. An optical sheet is printed from resin to a specified thickness, and items, coverings, or patterns may be printed onto the surface afterwards. Double-sided optical sheet 120 is adapted to act as a light-modifying component of lighting assembly 100 for homogenizing light emitted from light source 110. Each side of optical sheet 120 is impressed with a first lenticular pattern 121 or a second lenticular pattern 122, as further described below. Rather than using two optical sheets each having a lenticular pattern on only one side, double-sided optical sheet 120 is used as the sole optical sheet in lighting assembly.

The drawings of the figures are not made to scale; instead, double-sided optical sheet 120 is depicted with an exaggerated width to illustrate the lenticular patterns 121, 122, which would otherwise not be visible due to their small size. For example, double-sided optical sheet 120 may have a thickness of about 0.508-mm (20-mil), and the lenticular patterns 121, 122, may be about 0.2-mm to about 0.4-mm in width. In some embodiments, the lenticular patterns are about 0.254-mm in width. Double-sided optical sheet 120 is printed at a particular thickness for optimum homogeneity of lenticular patterns 121, 122.

First lenticular pattern 121 and second lenticular pattern 122 each comprise an array of light-modifying elements, such as an array of convex lenses. Each light-modifying element is configured to focus light according to a particular focal length. Each lenticular pattern comprises a parallel array of light-modifying elements aligned lengthwise with one another in a particular direction. In certain embodiments, first lenticular pattern 121 is arranged differently than second lenticular pattern 122 to intentionally scatter light in different directions. In some embodiments, the first and second lenticular patterns 121, 122 are configured to distribute light rays to appear homogenous to the viewer. For example, first lenticular pattern 121 is oriented in a first direction 142 that is offset by an offset angle 146 from a second direction 144 in which second lenticular pattern 122 is oriented. In some embodiments, the offset angle 146 is approximately ninety degrees such that the first lenticular pattern 121 and the second lenticular pattern 122 are oriented substantially perpendicular to one another (e.g., the first direction 142 is aligned laterally/horizontally and the second direction 144 is aligned longitudinally/vertically). However, other angles 146 between the lenticular patterns 121, 122 may be provided without departing from the scope hereof.

To convey a particular embodiment of the invention in operation, the path of the light through lighting assembly will be considered. The light path begins at light source 110 which emits multiple rays of light. The light is relatively focused and will retain hotspots, especially at locations directly in front of the individual LEDs. As the light rays pass through first lenticular pattern 121, the light rays are refracted depending on the location where the light rays come into contact with first lenticular pattern 121. In other words, the paths of individual light rays are refracted differently, providing different output angles of light, due to different input angles with respect to the lenticular lenses. Next, the light rays are refracted by second lenticular pattern 122 differently than first lenticular pattern 121 due to the different orientations of the first and second patterns 121, 122. Collectively, double-sided optical sheet 120 effectively disperses the light rays by refracting the light paths in different directions, thereby un-focusing the light and reducing hotspots.

A mask 130 is disposed to one side of double-sided optical sheet 120. Mask 130 comprises printed portions 135 and open portions 140. The printed portions 135 may comprise an opaque material configured to substantially block light emitted from light source 110. Alternatively or additionally, the printed portions 135 may comprise a translucent material configured to filter light. For example, the translucent material may be configured to filter light to a predetermined wavelength or range of wavelengths thereby emitting light of a certain color. Open portions 140 lack any opaque or translucent material and instead provide gaps that allow light to pass unfiltered after having passed through double-sided optical sheet 120.

The mask 130 may be applied directly onto a surface of double-sided optical sheet 120 via a printing process such as an inkjet printing process described above and in the incorporated-by-reference U.S. Patent Application Publication No. 2020/0282925 to Nykerk. To apply mask 130 directly to the optical sheet 120, optical sheet 120 is used as the substrate during printing and mask 130 is printed onto optical sheet 120. This process minimizes or prevents the formation of any gaps between mask 130 and optical sheet 120 such that mask 130 is supported by optical sheet 120. The open portions 140 may be formed by etching away the mask after the printing process or by protecting double-sided optical sheet 120 with a temporary layer during the printing process, followed by removal of the temporary layer. In embodiments, mask 130 may have a thickness of about 0.0762-mm (3-mil) to about 0.127-mm (5-mil), or anywhere in the range of 0.07 mm to 0.13 mm. By printing mask 130 directly onto optical sheet 120, no gap is created between mask 130 and optical sheet 120. Additionally, optical sheet 120 may support the entire weight of mask 130 and any additional masks printed onto optical sheet 120. A gapless and lens-supported printed design leads to vehicle lamp assembly 100 comprising relatively few parts and with a relatively compact construction, thereby reducing the complexity, cost, and weight of vehicle lamp assembly 100.

Figure 2:
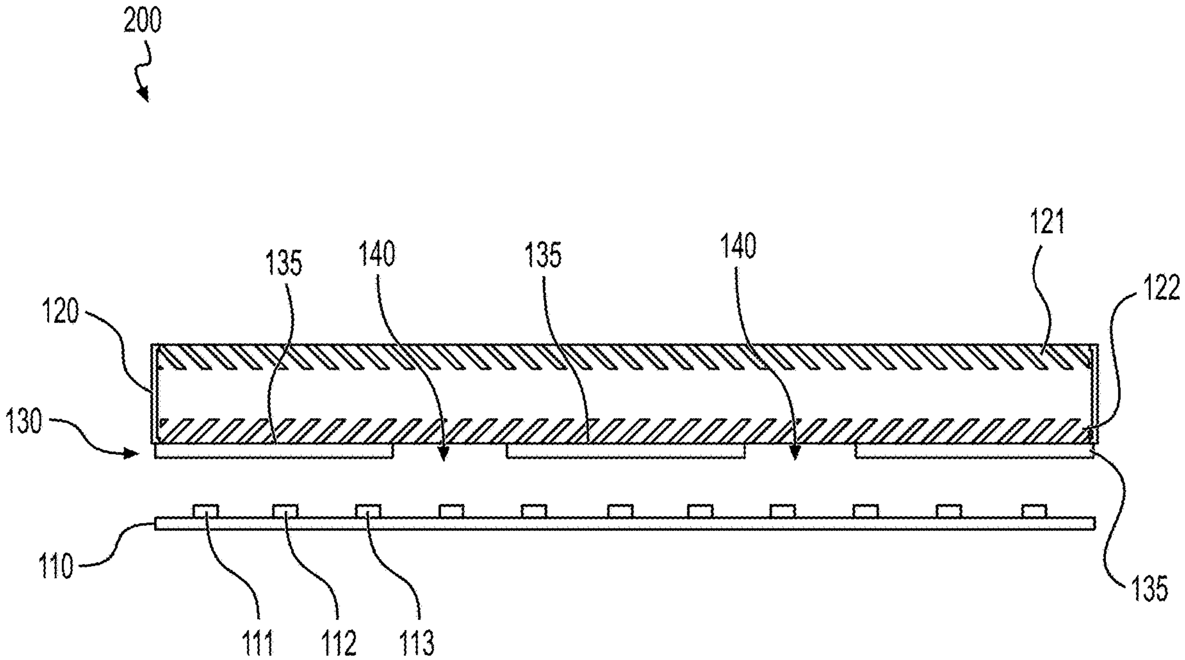
FIG. 2 is a schematic side view showing another embodiment of a vehicle lighting assembly.

FIG. 2 shows a vehicle lamp assembly 200 which is an example of lighting assembly with mask 130 applied onto an inner surface of double-sided optical sheet 120 instead of the outer surface as in FIG. 1. Items enumerated with like numerals are the same or similar and their description may not be repeated accordingly. By applying the mask 130 on the inner side, the mask 130 is protected from environmental elements outside of double-sided optical sheet 120. Alternatively, mask 130 may be applied on the outer side of optical sheet 120 to protect optical sheet 120 from environmental elements.

As depicted in FIGS. 1 and 2, mask 130 is applied directly onto one surface of double-sided optical sheet 120 with the array of LEDs 111, 112, 113, etc. located behind double-sided optical sheet 120 such that lighting assembly is backlit. In other words, light emitted through open portions 140 appears backlit from an exterior viewer of lighting assembly.

Figure 4:
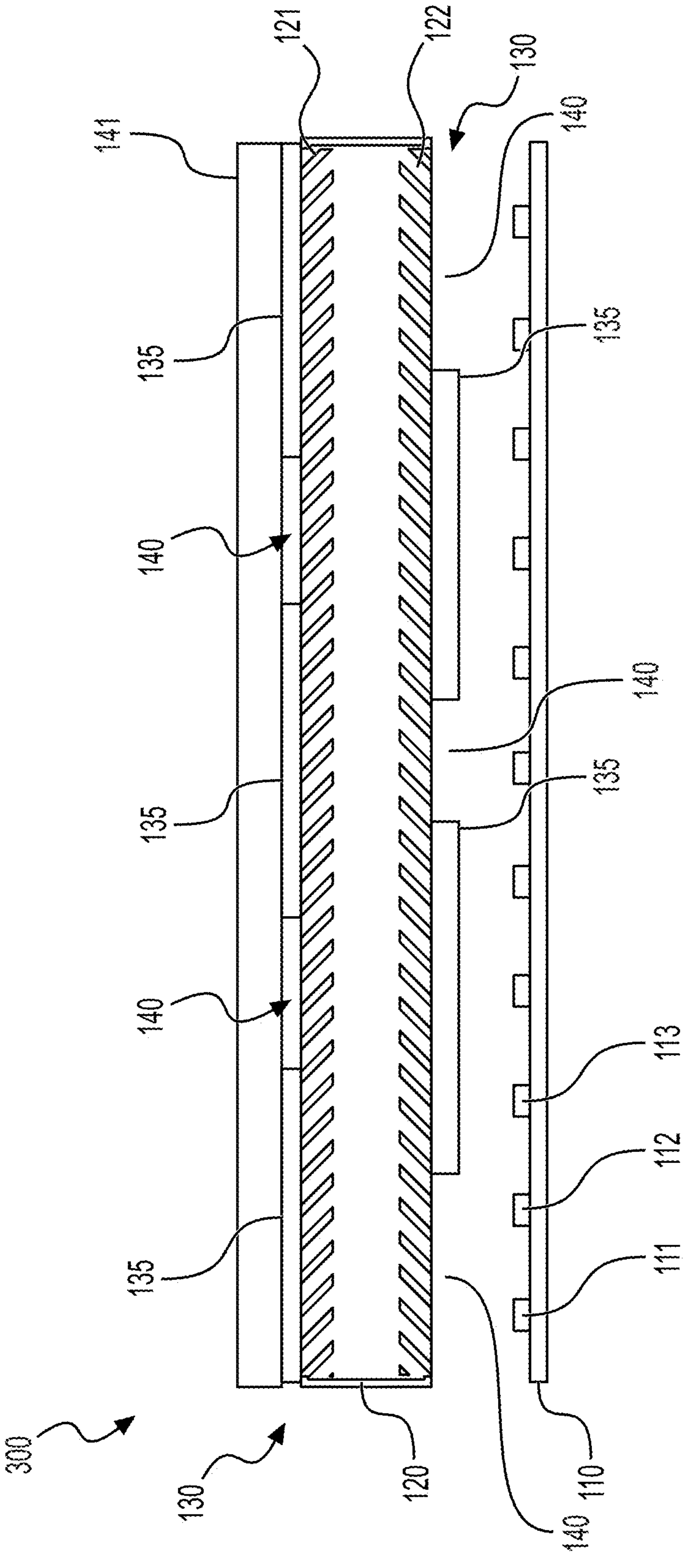
FIG. 4 is a schematic side view showing another embodiment of a vehicle lighting assembly.

In some embodiments, such as vehicle lamp assembly 300 of FIG. 4, a mask 130 may be applied to both sides of double-sided optical sheet 120. For example, an opaque mask is applied to one side while a translucent mask is applied to the opposite side, with the translucent portions covering some or all of the open portions of the opaque mask for filtering light emitted through the open portions. Multiple combinations of masks may be applied to opposite sides optical sheet 120 with either mask on the outside (facing the elements) or inside (facing light source 110), such as two translucent masks, two opaque masks, or one of each type of mask. Both masks are printed directly onto optical sheet 120.

Figure 3:
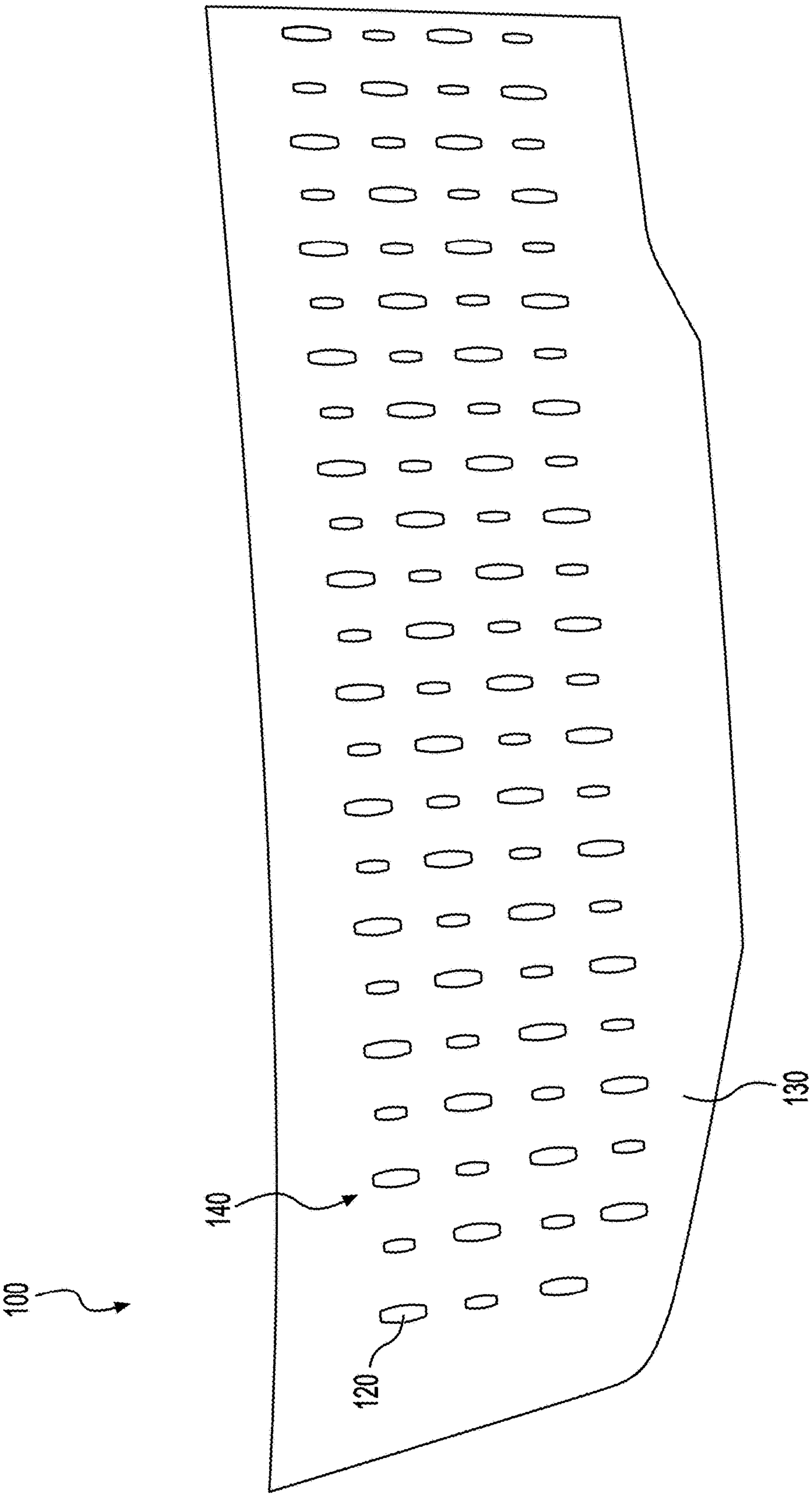
FIG. 3 is a drawing showing an example of the vehicle lighting assemblies described herein.

FIG. 3 shows an example of lighting assembly 100 having an opaque mask 130 with a plurality of open portions 140 that reveal double-sided optical sheet 120. The embodiment depicted in FIG. 3 may be bent to conform to the shape of an exterior of a vehicle for providing a decorative fascia having a backlit and homogenous lighting feature. In addition to decorative features such as fascia, lighting assembly 100 may be incorporated into vehicle lamp assemblies, including but not limited to a rear combination lamp (RCL), low-beam and high-beam headlamps, center high-mounted stop lamps, turn signals, lamps for aesthetic appearances, etc.

In operation, individual LEDs of light source 110 emit light that shines through double-sided optical sheet 120. As light passes through each of the first and second lenticular patterns 121 and 122, which are oriented at a different angle 146 from one another, light is refracted in different directions and distributed in a homogenous fashion. The homogenized light is projected to illuminate nearby objects, signal other drivers, or provide a decorative effect.

As shown in FIG. 4, the lighting assembly may comprise an outer lens 141 made of a substantially transparent material adapted to protect the optical sheet 120 and mask 130 from outside elements while allowing light to pass through. Light source 110, optical sheet 120, and the outer lens 141 may be structurally supported and held in alignment with one another via a housing (not shown) of the lamp assembly. In some embodiments, the outer lens 141 and optical sheet 120 are aligned substantially adjacent to one another (e.g., touching one another).

Figure 5:
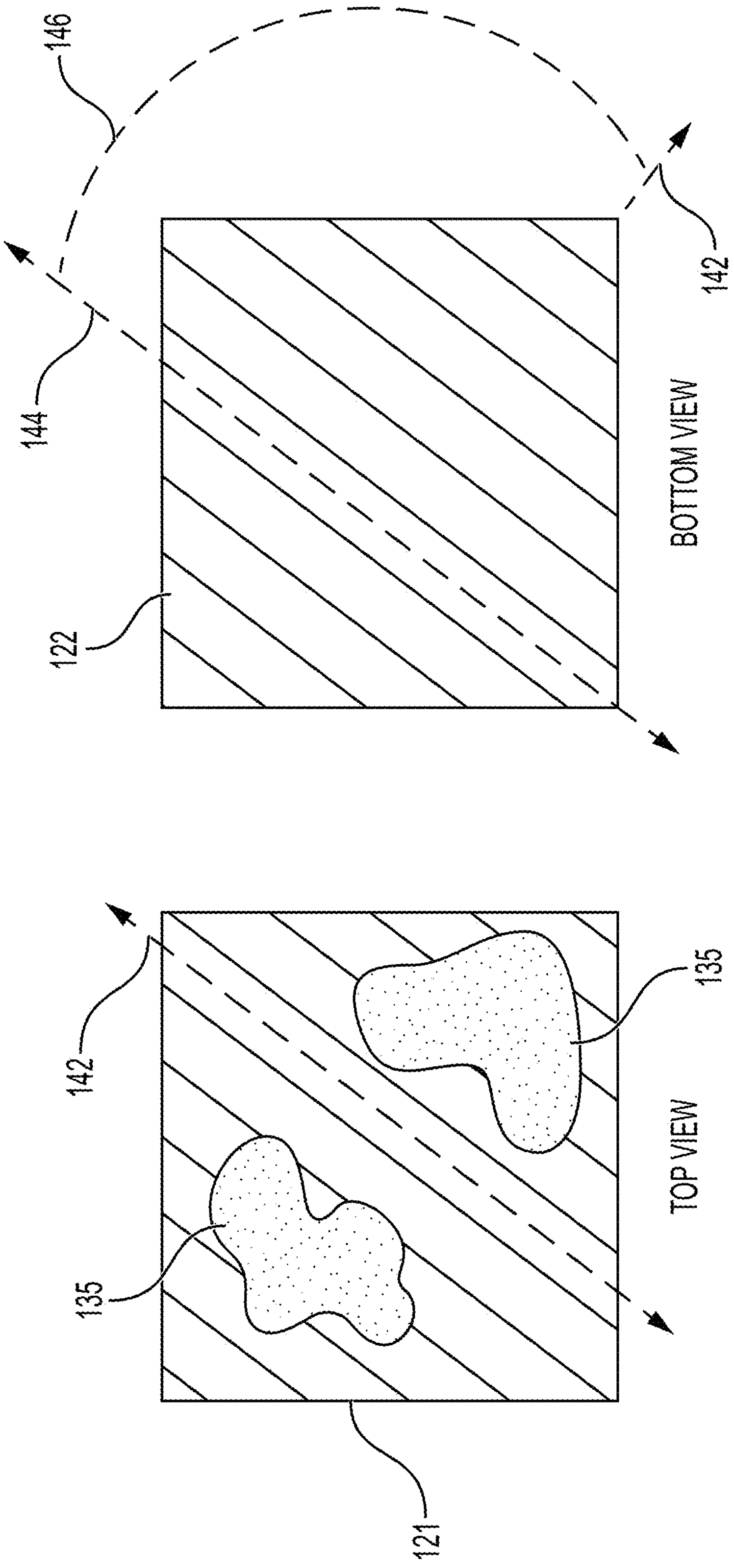
FIG. 5 is a drawing showing a sectional view of a portion of another embodiment of the vehicle lighting assembly, when viewed from the top and bottom. The drawing is not done to scale.
Figure 6:
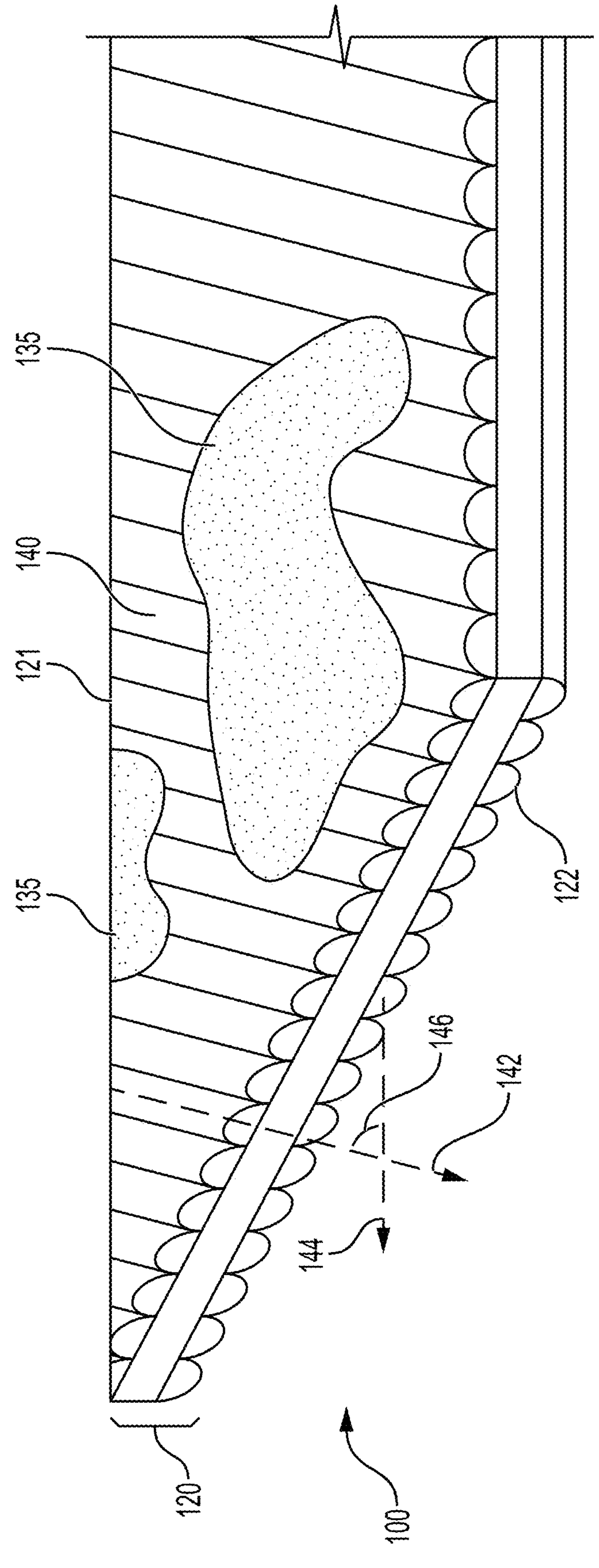
FIG. 6 is a drawing showing another sectional view of a portion of another embodiment of the vehicle lighting assembly, when viewed from a generally isometric perspective. The drawing is not done to scale.

FIG. 5 shows another example embodiment of the lighting assembly when looking at a particular cross section of the overall assembly (i.e., a roughly square cutout taken from the lighting assembly). In this example, the first lenticular pattern 121 is shown to have parallel array of convex lenses aligned lengthwise in a first direction 142. The second lenticular pattern 122, which is on the bottom/opposite face from first pattern 121, is shown to have a parallel array of convex lenses aligned lengthwise in a second direction 144 which is at an offset angle 146 from the first direction 142. The offset angle 146 is controllable when forming the optical sheet 120 such that the overall optical angles of each pattern 121, 122 (not shown) can be made closer or farther apart from one another (i.e., the lenses arrays are brought closer or farther from alignment). In some example embodiments, angle 146 is adjusted such that the directions 142, 144 are substantially perpendicular to one another, such that the distinct optical angles of the patterns 121, 122 counteract and homogenize the light which passes through the optical sheet 120. The first lenticular pattern 121 is also shown, in this embodiment, to have a custom mask 135 composed of continuous mask portions printed directly onto the surface of the lenticular lenses. Importantly, the term continuous, in regard to mask 135, means that the mask must be printed at different heights/elevations along pattern 121 to match the curvature of the convex (or concave in other embodiments) lenses imprinted into the optical sheet 120; else, the mask segments would be broken into an array of smaller printed portions which are not continuous throughout the custom shapes that are printed FIG. 6 shows another cross-sectional view of an embodiment of the lighting assembly, when viewed at a generally isometric angle. Like in FIG. 5, the optical sheet comprises the two patterns 121, 122 with respective longitudinal directions 142, 144 that are at an offset angle from one another 146. Likewise, the mask 135 is composed of continuous portions printed directly onto and across the surfaces of the convex lenses, with gaps 140 located between the mask portions. The mask 135 shown in this example may be just a small part of a larger printed pattern of portion sizes and shapes which form an overall custom mask shape and custom lighting assembly. The lenses are not drawn to scale and are shown in an exaggerated form for the sake of clarity.

The above example features vehicle lighting for a car, but the lighting assembly could be applied in a range of other automotive applications such as, trucks, motorcycles, vans, and buses, as well as other equipment such as, lawn mowers, off-road vehicles, golf carts, and tractors. Additionally, lighting features incorporating double-sided optical sheets may be used for commercial lighting (e.g., interior and exterior lighting for buildings).

A range of materials may be used in the production of lenticular sheets. Typical materials used are acrylic, polyvinyl chloride (PVC), amorphous polyethylene terephthalate (APET), and polyethylene terephthalate modified with glycol (PETG), though one skilled in the art would recognize that various other materials could be used to manufacture optical sheets with lenticular patterns. The criteria for defining a viable material is that the material provides the desired optical properties (e.g., transparent, semi-transparent, partially opaque, etc.), and that the material is compatible with the process selected for forming lenticular patterns on both surfaces of the optical sheet. In addition to extrusion processes and compression molding processes, other manufacturing methods could be used to produce double-sided optical sheets, such as injection molding and 3D printing.

Many different arrangements of the various components depicted, as well as components not shown, are possible without departing from the scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A lighting assembly for a vehicle, comprising:
- an array of light-emitting diodes;
- an optical sheet oriented to receive light emitted directly from the array of light-emitting diodes;
- a first pattern of light-modifying elements disposed on a first side of the optical sheet, wherein the first pattern of light-modifying elements comprises a first parallel array of convex lenses aligned lengthwise in a first direction;
- a second pattern of light-modifying elements disposed on a second side of the optical sheet opposite the first side, wherein the second pattern of light-modifying elements comprises a second parallel array of convex lenses aligned lengthwise in a second direction which is distinct from the first direction;
- an offset angle between the first direction and the second direction configured to distribute light emitted from the array of light-emitting diodes such that light emitted from the lighting assembly appears homogeneous; and
- a first mask printed directly on one side of the optical sheet for blocking or filtering light through a portion of the optical sheet thereby providing a custom lit appearance of the lighting assembly, wherein:
- the first mask comprises one or more continuous portions printed directly onto and across one or more subsets of the light-modifying elements, in a custom pattern;
- the one or more continuous portions of the first mask conform to the shape of and span the entire width of at least some of the light-modifying elements within the one or more subsets; and
- the pattern is selected, from amongst a plurality of possible custom patterns, to create the custom lit appearance of the lighting assembly by the mask's coverage of the one or more subsets of light-modifying elements.

2. The lighting assembly of claim 1, wherein the offset angle is approximately ninety degrees such that the first pattern of light-modifying elements is oriented substantially perpendicular to the second pattern of light-modifying elements.

3. The lighting assembly of claim 1, wherein the first mask comprises printed portions and open portions, the printed portions having an ink deposited directly on one side of the optical sheet and the open portions lacking the ink allowing light to pass unfiltered and unblocked after having passed through the optical sheet.

4. The lighting assembly of claim 3, wherein the printed portions comprise substantially opaque material configured to block light emitted from the array of light-emitting diodes.

5. The lighting assembly of claim 3, wherein the printed portions comprise substantially translucent material configured to filter light emitted from the array of light-emitting diodes.

6. The lighting assembly of claim 3, wherein the printed portions are configured to match an exterior color of the vehicle.

7. The lighting assembly of claim 3, comprising a second mask printed on the optical sheet, wherein the first mask is on one side of the optical sheet and the second mask is on an opposite side of the optical sheet.

8. The lighting assembly of claim 7, wherein the second mask comprises a translucent mask configured to cover some or all of the open portions of the first mask for filtering light emitted through the open portions of the opaque mask.

9. The lighting assembly of claim 8, wherein the first mask is printed on an exterior side of the optical sheet and the second mask is printed on an interior side of the optical sheet to further homogenize light incident on the optical sheet from the array of light emitting diodes.

10. The lighting assembly of claim 3, comprising an outer lens made of a substantially transparent material and configured to protect the optical sheet and first mask while allowing light to pass through.

11. The lighting assembly of claim 1, wherein the first mask is printed on an inner side of the optical sheet adjacent to the light-emitting diodes such that the first mask is protected from environmental elements outside of the optical sheet.

12. The lighting assembly of claim 1, wherein each pattern of light-modifying elements of the optical sheet comprises a parallel array of lenticular lenses having a width of about 0.2 mm to 0.4 mm.

13. The lighting assembly of claim 1, wherein the first mask comprises a thickness greater than 0.07 mm and less than 0.13 mm.

14. The lighting assembly of claim 1, wherein the printed portions cover more of the surface of the optical sheet than the open portions.

15. A method of creating a custom lighting assembly, comprising:

imprinting an optical sheet such that it has a first lenticular pattern formed onto a first side of the optical sheet and a second lenticular pattern formed onto a second side of the optical sheet opposite the first side, wherein the first lenticular pattern comprises a parallel array of lenses aligned lengthwise in a first direction and the second lenticular pattern comprises a parallel array of lenses aligned lengthwise in a second direction which is at an offset angle from the first direction;

selecting a custom lighting appearance desired from the custom lighting assembly;

selecting a shape for a custom mask for blocking or filtering light through a portion of the optical sheet, such that the selected custom lit appearance is created by shining light through the optical sheet, wherein the custom mask comprises one or more mask portions printed on the first side, second side, or both the first and second sides;

printing the one or more portions of the custom mask directly and continuously across one or more subsets of the lenticular lenses, such that the mask portions conform to the shape of, stretch across, and span the entire width of at least some of the lenticular lenses within the one or more subsets; and shining light through the optical sheet using an array of light-emitting diodes.

16. The method of claim 15, wherein the printed portions cover a majority of the first side, second side, or both sides of the optical sheet.

17. The method of claim 15, wherein the custom mask comprises opaque material configured to substantially block light emitted from the array of light-emitting diodes.

18. The method of claim 15, wherein the custom mask comprises translucent material configured to filter light emitted from the array of light-emitting diodes.

19. The method of claim 15, wherein the mask comprises a thickness greater than 0.07 mm and less than 0.13 mm.

20. The method of claim 15, wherein the lenticular lenses comprise a width of about 0.2 mm to 0.4 mm.

* * * * *